Sept. 28, 1926.
J. HOLTZMAN
1,601,392
PROP FOR MOTORCYCLES AND THE LIKE
Filed Jan. 9, 1922
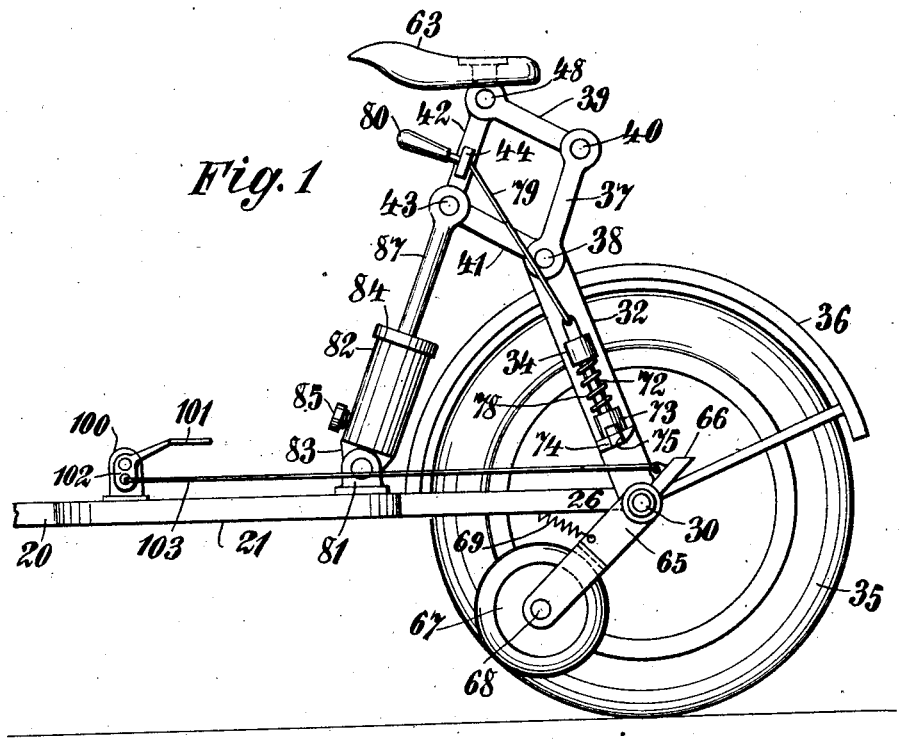
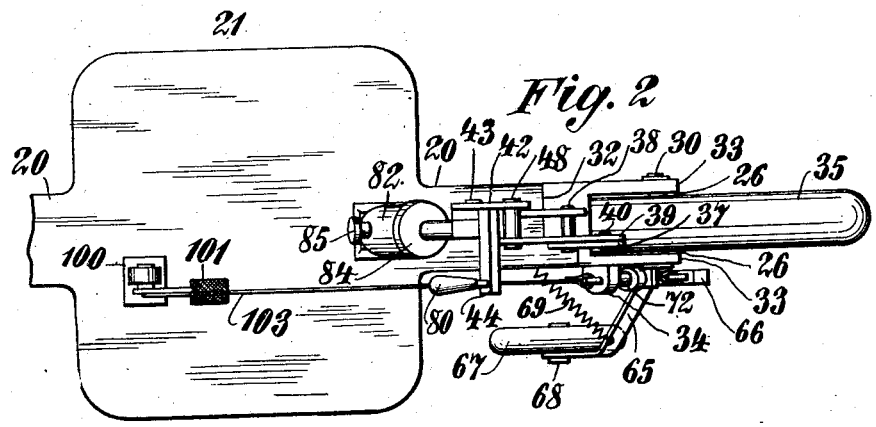
INVENTOR
John Holtzman.
BY
ATTORNEY Patented Sept. 28, 1926.

1,601,392

UNITED STATES PATENT OFFICE.

JOHN HOLTZMAN, OF NEW YORK, N. Y.

PROP FOR MOTOR CYCLES AND THE LIKE.

Application filed January 9, 1922. Serial No. 528,005.

The object of this invention is the production of a prop for a motor cycle and the like that can be operated by the user of the motor cycle while standing on a platform of the motor cycle or seated on a seat thereof. The second object of the invention is the production of a prop for a motor cycle and the like by the attachment of a third wheel which coacts with the main rear wheel of the motor cycle to maintain it in an upright position when not in use and when starting to run.

In the accompanying drawings Fig. 1 shows a side elevation of the improved prop with the rear portion of a motor cycle with certain elements removed and Fig. 2 represents a top plan view of Fig. 1 with same elements omitted.

Referring to the drawings a frame 20 has formed therewith at about its middle portion the platform 21. The rear end of said frame has formed therewith the bifurcated end with the members 26, in which is journaled the rear axle 30 of the motor cycle. A bracket 32 is indicated with the bifurcated lower portion having the members 33. A guide sleeve 34 extends from the bracket 32. A rear wheel 35 of the motor cycle is fastened to the rear axle 30. A guard 36 for the rear wheel 35 extends from the frame 20. At the upper end of the bracket 32 is pivoted the link 37 by means of the pin 38. A second link 39 is pivoted to the link 37 by means of the pin 40. A third link 41 has one end supported on the pin 38 and to its other end is pivoted the fourth link 42 by means of the pin 43. A guide lug 44 extends from the link 42. The links 39 and 42 are connected to each other by locking pin 48. A seat 63 is connected to the pin 48.

An arm 65 is pivoted on the axle 30 and has formed therewith the latch hook 66. An adjustable supplementary third rear wheel 67 is journaled to the arm 65, by means of the axle 68. A spring 69 has one end fastened to the frame 26 and its other end is fastened to the arm 65. A plunger 72 having the head 73 is guided in the guide sleeve 34. A wearing plate 74 is fastened to the head 73. A latch opening 75 is formed in the head 73 and the plate 74. A spring 78 encircles the plunger 72 and bears between the guide sleeve 34 and the head 73. A wire cord 79 having one end fastened to the plunger 72, extends through the guide lug 44 and has fastened thereto the handle 80.

A journaled bracket 81 is supported upon and fastened to the platform 21. A buffer cylinder 82 has formed with its bottom wall the journal lug 83, which is pivoted to the journal bracket 81 and its top end is provided with the cap 84. A relief and adjusting valve 85 is fitted to the wall of the cylinder 82 adjacent to its bottom end. A piston, not shown, in the cylinder has extending therefrom the piston rod 87 which extends through the cover 84. The top end of the piston rod 87 is supported on the pin 43. A spring, not shown, is located in the cylinder 82 and bears between its bottom wall and the said piston in the cylinder 82.

A journal bracket 100 is supported on and fastened to the platform 21. A foot pedal 101 has formed therewith the arm 102 and is pivoted to the bracket 100. A wire cord 103 has one end fastened to the arm 102 and its other end is fastened to the latch hook 66. When the operator bears down on the foot pedal 101 the latch hook 66 is forced upwardly and locks with the latch opening 75, and at the same time the supplemental rear wheel 67 is brought down to the ground. To unlock the latch hook 66 form the head 73, the operator pulls the handle 80.

Various modifications may be made in the invention and the present exemplification is to be taken as illustrative and not limitative thereof.

Having described my invention what I desire to secure by Letters Patent and claim is:

1. In a motorcycle the combination of a frame, a rear wheel for the frame, an arm pivoted on the axle of the rear wheel, an axle at the outer end of said arm, a supplementary wheel journaled on the latter axle, means to swing said arm with its supplementary wheel, a latch hook extending from the arm, a bracket on the axle of the rear wheel, a guide sleeve for said bracket, a spring actuated plunger guided in said guide sleeve and having a head with a latch opening, said opening adapted to lock with said latch hook, and means to unlock said latch hook from said latch opening.

2. In a vehicle of the character described the combination of a frame, a rear axle suported in the frame, a rear wheel journaled on the axle, a bracket with its lower end detachably supported on the axle, a seat, elements interposed between the seat, the bracket and the frame, and a swinging prop supported on the axle.

3. In a vehicle of the character described the combination of a frame, an axle supported in the frame, a rear wheel journaled on the axle, a bracket with its lower end detachably connected to the axle, a seat above said bracket and a swinging prop supported on the axle.

4. In a motorcycle the combination of a frame, an axle for the frame, a rear wheel journaled on the axle, a prop pivoted to the axle, means to swing said prop, a latch hook extending from the prop, a bracket with its lower end supported on the axle, and a latch mechanism carried by said bracket coacting with said latch hook.

Signed at the borough of Manhattan, city of New York in the county of New York and State of New York this 6th day of January A. D. 1922.

JOHN HOLTZMAN.